United States Patent [19]

Yoder et al.

[11] 3,850,145
[45] Nov. 26, 1974

[54] SUPPLEMENTAL FEEDER

[76] Inventors: David Alfred Yoder, 1893 Jermain Dr., Columbus, Ohio 43219; Daniel Alvin Lapp, 5928 Game Farm Rd., Urbana, Ohio 43078

[22] Filed: Oct. 5, 1973

[21] Appl. No.: 403,763

[52] U.S. Cl. .................................. 119/51 R, 119/56
[51] Int. Cl. .............................................. A01k 5/02
[58] Field of Search ........... 119/51 R, 51.11, 52 AF, 119/56, 54

[56] References Cited
UNITED STATES PATENTS

| | | | |
|---|---|---|---|
| 3,541,995 | 11/1970 | Fathauer | 119/51 R |
| 3,557,757 | 1/1971 | Brooks | 119/51 R |

*Primary Examiner*—Hugh R. Chamblee
*Attorney, Agent, or Firm*—Richard G. Wynne

[57] ABSTRACT

A selective supplemental feeding apparatus is provided for feeding animals wherein the animal has a passive device hung from its neck which selectively causes movement of one of two magnets in the feed box from an off position to an on position which thereby causes delivery of feed, the magnets being biased by gravity to the off position and creating a magnetically influenced portion at two horizontally aligned locations at the front member of the feed box to facilitate feed delivery when the animal moves its neck and head.

8 Claims, 9 Drawing Figures

PATENTED NOV 26 1974 3,850,145

SUPPLEMENTAL FEEDER

BACKGROUND OF THE INVENTION

Certain cows in a herd require supplemental feeding. It is estimated single cow supplemental feeder of this invention will service about 40 cows. Rather sophisticated electrical systems have been proposed but have proven to be expensive and difficult for the farmer to maintain and service. Passive devices, such as chains, and active devices, such as magnets, have been proposed as the identifying element to be carried by the selected cow. However, the systems have not met the need and the magnets carried by the cow can collect nails and the like and thereby cause serious problems should the magnet inadvertently get into the feed bin as the cow swings its head.

SUMMARY

This invention provides a system wherein the initial cost is reduced and maintenance and service are reduced. A feed box is provided for feed delivery from a storage bin or tank. A pair of horizontally aligned magnet controlled micro-switches are provided inside the feed box, each magnet being uniquely combined with its respective switch to insure actuation of the switch by a selected cow wearing a passive device, for example, nothing more than a dangling line of chain links, or the like. Each magnet is biased by gravity to an off position and swings forwardly toward the chain links to an on position. The two magnets produce horizontally aligned magnetically influenced portions at the front member over which the animal places its neck. These magnetically influenced portions are predeterminedly horizontally spaced to insure feed flow with no stopping even though the animal moves its head from side to side and leaves the influence of one influenced portion.

BRIEF DESCRIPTION OF THE DRAWINGS

The accompanying drawings show exemplary embodiments of this invention, in which.

DESCRIPTION OF ILLUSTRATED EMBODIMENTS

Figure 1:
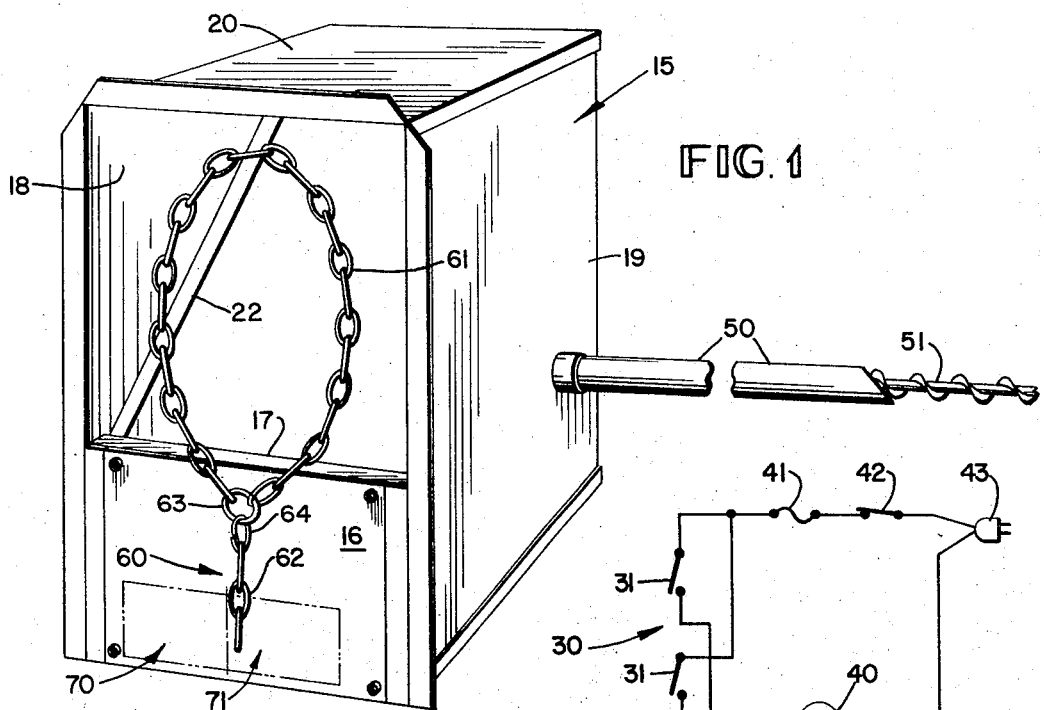
FIG. 1 is a perspective view of the feed box showing a passive ferrous metal device worn by the cow and positioned to close one or possibly both of the switches.
Figure 4:
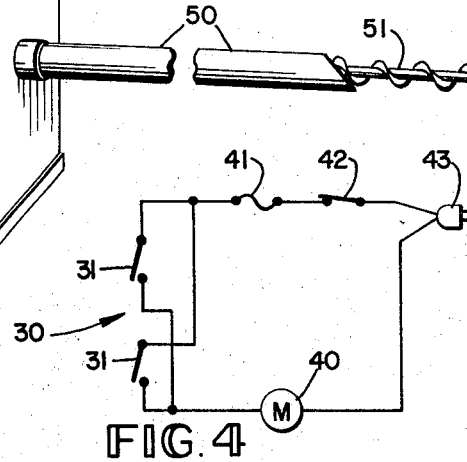
FIG. 4 is a schematic type circuit diagram.
Figure 2:
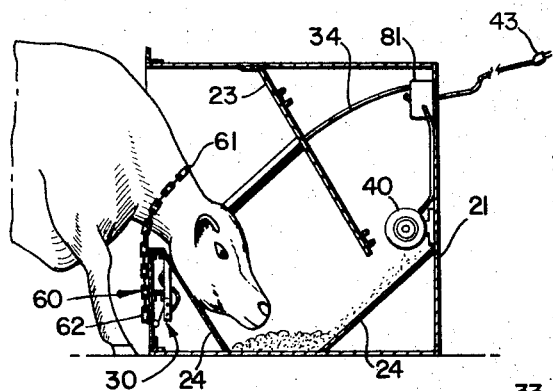
FIG. 2 is a side view with a side wall removed showing the location of parts on the feed box and a cow's head therein.

FIGS. 1-7 show the apparatus as including:
a feed box 15 having a front member 16 with top edge 17, side walls 18 and 19, top 20, back wall 21, wire conduit 22, protective baffle 23, and trough 24;

a control means 30 including two micro-switches 31, each having a lever 32, a magnet 33 and wiring 34;

a gear motor 40, a fuse 41, a master switch 42 and wiring and plug 43;

a feed delivery system including a tube 50 and auger 51 which extends internally thereof from the feed box 15 to a feed bin (not shown); and a ferrous metal passive device 60 which hangs from the cow's collar 61, this device 60 being shown as three links 62 of chain coupled to the collar ring 63 by the coupler 64, the coupler 64 and three links 62 being about 4 and ½ inches long.

The cow on placing its head centrally into the trough 24 causes the passive device 60 to be positioned at one of the two magnetically influenced portions 70 or 71 shown schematically as a single rectangle in dotted lines in FIG. 1. This causes one of the magnets 33 to swing forward, thereby causing actuation of the gear motor 40 and causing auger 51 (4 feet long and 2 inches in diameter) to force feed through tube 50 into the side of trough 24 as shown in dotted lines in FIG. 3. If the cow does not eat at the rate of feed delivery, a pile develops at the side of the trough 24, and the cow naturally moves its head and neck to the pile at the auger inlet, thereby moving the passive device out of the zones 70 and 71 which causes the magnet 33 to fall back due to gravity and stop feed delivery.

The feed box is 24 inches tall, 23 inches deep and 14 inches wide; the front member 16 being of aluminum or other suitable material and is 14 inches wide and 10 inches high. The front opening is 14 by 14 inches. The electrical components operate on 110 volts A. C. with (FIG. 4) a plug 43, fuse 41, master switch 42, gear motor 40 (1/20 to 1/40 H.P., 1.3 amps. at full load, 4 to 6 rpm), and micro-switches 31. Micro-switches 31 are each rated at 15 amps, over ten times heavier than needed, which enables the elimination of expensive electrical components, such as relays etc. while providing a sound and relatively inexpensive system.

Figures 5, 6, 7:
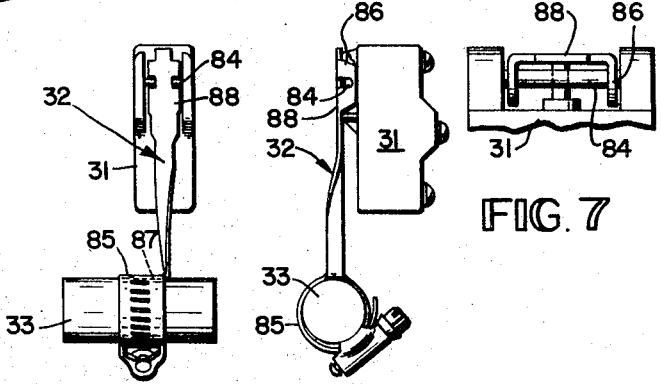
FIG. 5 is a front view of the switch lever and magnet pivotally mounted on the switch.
FIG. 6 is a side view of FIG. 5.
FIG. 7 is a top end view of FIG. 6.
Figure 3:
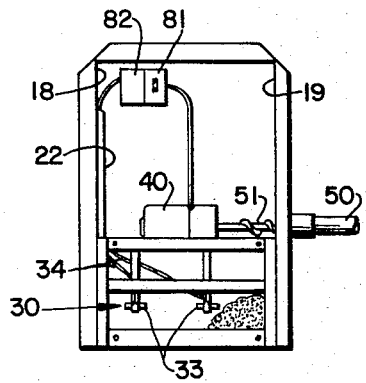
FIG. 3 is a front view with the front member removed.

FIGS. 5-7 show depending lever 32 and its pin 84 by which it is pivotally mounted at its upper end to micro-switch 31. Lever 32 is connected by clamp 85 to rod magnet 33. Magnet 33 is positioned about eight inches below the top edge 17 and is about three inches long and ¾ inch in diameter. The vertical lever 32 has bearing ears 86 formed at right angles to the main strip 88, and the lower portion is twisted 90 degrees and then bent horizontally at its lower end at a right angle to form a bottom leg 87 for clamped sandwiched engagement by clamp 85 with the magnet 33.

Figures 8, 9:
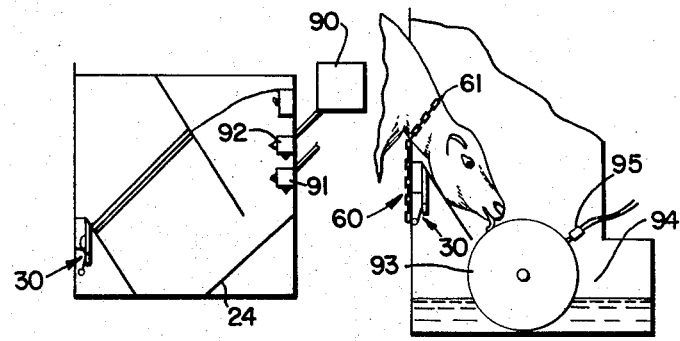
FIG. 8 is a schematic side view of a valved liquid feeder controlled by solenoids.
FIG. 9 is a schematic side view of a lick wheel liquid feeder which has a solenoid operated brake.

FIG. 8 shows liquid feed delivery wherein liquid from tank 90 is allowed to flow to trough 24 when the solenoid valve 91 is opened by control means 30. In cold weather, a thermostatic solenoid 92 may be employed to operatively respond to low temperatures and provide the required volume of feed.

FIG. 9 shows a lick wheel 93 in tank 94 for feeding liquid feed upon turning by a cow's tongue. A device of this general nature is found in U.S. Pat. No. 2,651,291 to Duke of Sept. 8, 1953. A solenoid operated brake 95 is released when control means 30 is turned on by a selected animal.

It will be understood from FIG. 1, that the magnetically influenced portions 70 and 71 are horizontally aligned and predeterminedly spaced to insure continuous operation as the chain links 62 are swung by the cow. This means that portions 70 and 71 are spaced horizontally, preferably, to insure a continuous operation of the auger 51. The central vertical limits of portions 70 and 71 may be overlapping, just touching at some point, or adjacent. This situation, of course, may be a function of the power of the magnets 33 and their fields, this varying due to production variations of the magnets and age. Even if the central vertical limits of the portions do not touch or overlap, the normal chain movement from oneportion 70 to the other portion 71 results in no stoppage of feed delivery.

We claim:

1. In an apparatus for the supplemental feeding of selected animals of a group from a feed delivery system, and wherein each selected animal has a magnetically attractable passive device hanging from its neck;

a trough for receiving feed from the feed delivery system having a front member with a top edge over which the animal places its neck when feeding from said trough, said top edge being of predetermined height to prevent entry into said trough of said passive device, control means operatively connected to the feed delivery system including a pair of horizontally spaced electric switches, each having an actuating lever including a magnet which through gravity assumes an off position near the inside face of said front member and below the top edge thereof a distance operatively coordinated with said passive device, said front member being provided with a magnetically influenced portion to separate the magnet from the passive device, said magnetically influenced portion being of a material which does not attract said magnet, each switch being in on position when its magnet moves forward to a position closer to or at the inside face of said front member in response to the presence of said passive device at the outside face of said front member at its respective magnetically influenced portion thereby activating the feed delivery system to deliver feed to said trough; the two magnetically influenced portions being predeterminedly spaced horizontally to enable magnet movement in response to the swinging and horizontal movement of the passive device as the animal's head and neck are moved.

2. In an apparatus as defined in claim 1, and wherein said feed delivery system feeds in at a side of the trough a distance from said two magnetically influenced portions of said front member such that on movement of said passive device toward said side and away from said magnetically influenced portions, said magnet returns to off position and feeding of the auger stops.

3. In an apparatus as defined in claim 1, and including a series of ferrous chain links hanging from the collar on the animal which serves as the passive device.

4. In an apparatus as defined in claim 1, and wherein said feed delivery system is a system for delivering liquids, said control means operatively regulating a solenoid operated valve which allows liquid flow when open.

5. In an apparatus as defined in claim 4, and wherein a second solenoid operated valve with thermostatic means is included for selective use for cold weather feed delivery.

6. In an apparatus as defined in claim 1, and wherein the feed delivery system is a lick wheel moved by the animal and including an electrically controlled brake for said wheel operatively connected to said control means.

7. In an apparatus as defined in claim 1, and wherein the feed delivery system includes an auger driven by an electric motor operatively connected to said control means.

8. An apparatus for delivering feed from a bin for the supplemental feeding of selected animals, comprising:

a magnetically attractable passive device adapted to hang from a selected animal's neck;

a feed box having a trough and a front member having a top edge over which the animal places its neck, said top edge being of a predetermined height to prevent entry into said trough of the passive device hung from the animal's neck;

said feed box including side walls and a back wall, an electric gear motor mounted on said back wall, an auger connected to said motor and extending through a side wall and extending into the feed box;

control means operatively connected to said motor including a pair of horizontally spaced electric micro-switches mounted adjacent the insideface of said front member, a lever pivotally mounted on each of said switches and extending downwardly and having attached to its lower end a horizontally disposed magnet adjacent the front member, said front member being provided with a magnetically influenced portion thereof operatively coordinated with the hanging passive device, said magnetically influenced portion of said front member being of a material not attractive to said magnet, each micro-switch being in off position when its lever and magnet are affected solely by gravity thereby not activating the motor, each micro-switch being in on position when its magnet moves toward the front member in response to the presence of said passive device at the outside face of said front member at its magnetically influenced portion thereby activating said motor to deliver feed to said trough.

* * * * *